United States Patent Office 3,772,321
Patented Nov. 13, 1973

3,772,321
ANTHRAQUINONE COMPOUNDS
Christian Zickendraht, Binningen, Arthur Buehler, Rheinfelden, and Hans Ulrich Schuetz, Basel, Switzerland, assignors to Ciba-Geigy AG, Basel, Switzerland
No Drawing. Filed Feb. 10, 1971, Ser. No. 114,400
Claims priority, application Switzerland, Mar. 26, 1970, 4,652/70
Int. Cl. C07d 49/38, 85/48, 91/44
U.S. Cl. 260—309.2          3 Claims

ABSTRACT OF THE DISCLOSURE

Anthraquinone compounds of the general formula

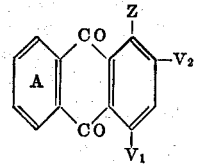

wherein Z denotes a hydrogen atom, an —NH$_2$, —NH-alkyl, NH-aryl or —OH group, V$_2$ denotes a hydrogen or halogen atom or an alkyl, alkoxy, cyano or sulphonic acid group and V$_1$ denotes a five-membered heterocyclic radical which is bound via a sulphur atom to the anthraquinone nucleus, contains a further hetero-atom in the ring apart from a ring nitrogen atom, and a sulphonic acid, sulphone or sulphonamide radical or a reactive radical, and wherein the ring A can contain further substituents.

---

This invention provides new anthraquinone compounds of the general formula

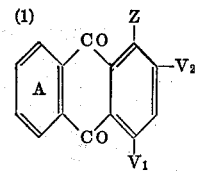

wherein Z denotes a hydrogen atom, an —NH$_2$, —NH-alkyl, NH-aryl or —OH group, V$_2$ denotes a hydrogen or halogen atom or an alkyl, alkoxy, cyano or sulphonic acid group and V$_1$ denotes a five-membered heterocyclic radical which is bound via a sulphur atom to the anthraquinone nucleus, contains a further hetero-atom in the ring apart from a ring nitrogen atom and a sulphonic acid, sulphone, or sulphonamide radical or a reactive radical, and the ring A can contain further substituents.

The five-membered heterocyclic radical can for example contain an oxygen or sulphur atom, or especially a second nitrogen atom, as a further hetero-atom in the ring. In particular, the heterocyclic structure can contain a second fused ring, for example a benzene ring. The heterocyclic structure is bound to the bridge S atom directly or via a grouping bound to the heterocyclic structure, for example a fused ring. Examples of five-membered heterocyclic radicals which may be mentioned are: the pyrazole, pyrazoline, pyrazolidone, pyrazolone, imidazole, oxazole, oxazoline, oxazolidine, thiazole, 1,2,3- and 1,2,4-triazole, 1,2,4- and 1,3,4-thiadiazole and especially the benzimidazole, benoxazole and benzthiazole radical.

Amongst the compounds of the Formula 1 according to the invention which contain a benzimidazole, benzoxazole or benzthiazole radical as the five-membered heterocyclic radical, those of the formula (2)

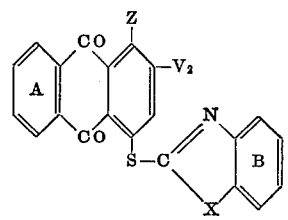

wherein A, Z and V$_2$ have the same meaning as in the Formula 1, X denotes an —NH—, —NR—, —O— or —S— radical, R representing an alkyl or aryl radical, and the ring B contains a sulphonic acid sulphone, or sulphonamide radical or a reactive radical, are particularly important. Apart from the groupings mentioned, the ring B can contain further substituents, for example halogen atoms or alkyl groups.

Halogen atoms, for example chlorine or bromine atoms, and hydroxyl, amino and alkylamino groups may be mentioned as further substituents in the ring A. Compounds of the general Formula 1 which contain no further substituents in the ring A, or only contain sulphonic acid groups in the ring A, are however preferred. If the ring B in the compounds of the Formula 2 contains a sulphonamide radical, the compounds of the Formula 2 preferably either do not contain any group which imparts solubility in water, the ring A being unsubstituted, or only contain sulphonic acid groups as substituents, apart from Z. If the ring B contains a sulphonic acid group, preferably again only sulphonic acid groups are present as substituents apart from Z. If a reactive radical is present in the ring B, the compounds of the Formula 2 preferably contain at least one sulphonic acid group and in particular two or three sulphonic acid groups, of which one is preferably bound to the ring B, and apart from Z no further substituents.

The preferred compounds of the Formula 2 correspond to the formulae (3)

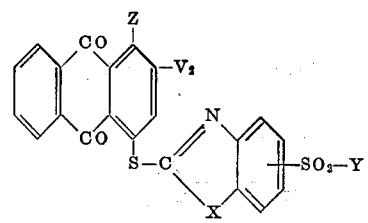

(4)
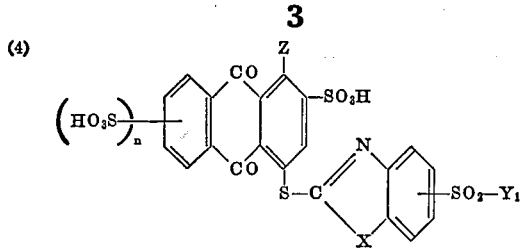

and
(5)
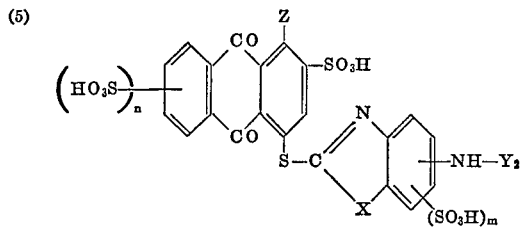

wherein Z, X and $V_2$ have the same meaning as in the Formula 2, Y denotes an amino group, $Y_1$ denotes an HO-group or an amino group, $Y_2$ denotes a reactive radical and n and m each=zero or 1.

The amino group Y or $Y_1$ represents an $H_2N$-group or a secondary or a tertiary amino group. The tertiary amino group can also be a heterocyclic radical containing a nitrogen atom, the radical being bound to the —$SO_2$— bridge via the nitrogen atom.

Suitable heterocyclic radicals containing a ring nitrogen atoms which are bound via the nitrogen atom to the —$SO_2$— bridge, are especially the radicals of six-membered heterocyclic compounds containing an —NH— group, for example morpholine, 1,4-thiazine, piperidine, piperazine and the like. As the secondary or tertiary amino group, N-alkylamide, N-alkoxyalkylamide, N,N-dialkylamide or N,N-dialkoxyalkylamide groups can for example be bound to the —$SO_2$— bridge, and the alkyl radicals can also be cyclic alkyl radicals, for example the cyclohexylamide radical. Similarly cycloalkyl radicals can be bound to non-cyclic alkylamide radicals, for example in the 2-cyclohexyl-ethylamide radical. Suitable substituents on the nitrogen atom of the amino group are however also aromatic radicals, for example the N-phenylamide or N-phenyl-N-methylamide radical. Similarly, the group Y or $Y_1$ can also contain aralkyl radicals, for example the N-phenylmethylamide radical.

Compounds of particular interest are, however, those of the general Formulae 3 and 4, wherein Y or $Y_1$ each represents a secondary or tertiary amino group which contains aliphatic alkyl or alkoxyalkyl radicals. Suitable alkyl and alkoxyalkyl radicals are both those having shorter or longer carbon chains, as for example in the methylamino, isopropylamino, butylamino, dibutylamino or isopropoxypropylamino group.

The substituent Z is preferably —$NH_2$, —$NHCH_3$ or —OH, and thus not a hydrogen atom. Suitable substituents $V_2$ are particularly a hydrogen, chlorine or bromine atom, low molecular alkyl or alkoxy radicals, especially a methyl or methoxy radical, and sulphonic acid groups.

When X in the Formulae 2 to 5 represents an —NR— radical, R is preferably an alkyl radical, for example a methyl, ethyl, propyl, isopropyl or butyl radical, and especially an alkyl radical substituted by alkoxy groups, for example a methoxyethyl, methoxypropyl or isopropoxypropyl radical.

Suitable reactive radicals are groupings capable of reacting with the hydroxyl groups of cellulose or the carbamide groups of polyamides to form a covalent chemical bond. Such a grouping in particular is a low molecular alkanoyl or alkylsulphonyl radical substituted by a removable atom or group, a low molecular alkenoyl or alkenesulphonyl radical optionally substituted by a removable atom or group, a 4-, 5- or 6-membered carbocyclic or heterocyclic radical substituted by a removable atom or group bound via a carbonyl or sulphonyl group, or a triazine or pyrimidine radical bound directly via a carbon atom and substituted by a removable atom or group, or contains such a radical. Preferentially, the reactive radical $Y_2$ is an aliphatic, saturated or unsaturated acyl radical which is bound to the ring B through an —NH-group and preferably contains halogen atoms, especially an $\alpha,\beta$-dibromopropionyl or $\alpha$-bromoacryloyl radical.

The indices n and m are independent of one another. The groups —$SO_2$—Y, —$SO_2$—$Y_1$ or —$SO_2$—$Y_2$ can be present in the 4-, 5-, 6- or 7-position of the benzimidazole, benzoxazole or benzthiazole nucleus. The —$SO_3H$ group can also occupy one of the 4- to 7-positions of the benzimidazole, benzoxazole or benzthiazole nucleus in so far as it is free, and the second —$SO_3H$ group can occupy one of the 5- to 8-positions in the anthraquinone nucleus.

The invention also provides a new process for the manufacture of compounds of the Formula 1 which comprises condensing compounds of the formula (6)
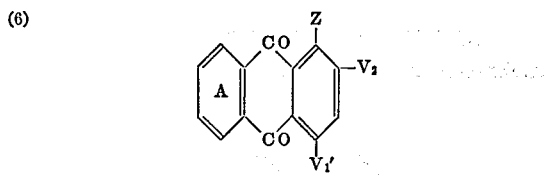

wherein A, Z and $V_2$ have the meaning indicated for Formula 1, and $V'_1$ represents a halogen atom or a mercapto group, with five-membered heterocyclic compounds containing a mercapto group or a halogen atom, which apart from a ring nitrogen atom contain a further hetero-atom in the ring, and a sulphonic acid, sulphone, sulphonamide or reactive radical, with splitting off of hydrogen halide.

The condensation takes place in a known manner in an organic solvent, for example ethanol or butanol, or, for example when an appropriate anthraquinone sulphonic acid is used as the starting material, in aqueous solution and in the presence of an acid-binding agent, for example potassium carbonate or sodium bicarbonate, at elevated temperature. The condensation is advantageously carried out with addition of a copper salt and copper powder.

The mercaptobenzimidazoles, mercaptobenzoxazoles and mercaptobenzthiazoles which can be used as starting compounds, and which are also a subject of the present invention, can advantageously be obtained by condensation of the corresponding o-diaminobenzene, o-amino-hydroxybenzenes or o-amino-mercaptobenzenes with hydrogen sulphide.

The anthraquinone compounds of the Formula 1 which contain a reactive radical can also be manufactured by introducing the reactive radical into the molecule, for example by acylation with an acid chloride or acid anhydride which releases a reactive acyl radical, for example after the condensation of a halogenoanthraquinone with an appropriate heterocyclic compound.

As starting compounds of the anthraquinone series which are suitable for the manufacture of the compounds of the Formula 1, there may be mentioned:

1-amino-4-bromoanthraquinone,
1-amino-4-chloro-anthraquinone,
1-amino-,4-dibromoanthraquinone,
1-amino-2,4-dichloroanthraquinone,
1-amino-4-bromo-2-methylanthraquinone,
1-methylamino-4-chloro- or -bromoanthraquinone,
1-(2',6'-dibromo-4'-methyl)-phenylamino-4-bromo-anthraquinone,
1-ethylamino-4-bromoanthraquinone,
1-n-propylamino-4-bromoanthraquinone,
1-isopropylamino-4-bromoanthraquinone, 1-phenylamino-4-bromoanthraquinone,
1-(4'-methoxy)-phenylamino-4-bromoanthraquinone,
1-(2',4',6'-trimethyl)-phenylamino-4-bromoanthraquinone,
1-(4'-methyl)-phenylamino-4-bromoanthraquinone,
1-hydroxy-4-chloro- or -bromoanthraquinone,
1-hydroxy-2-methyl-4-chloroanthraquinone,
1-hydroxy-2,4-dichloroanthraquinone,
1-hydroxy-2,4-dibromoanthraquinone,
1-amino-4-bromoanthraquinone-2-sulphonic acid,
1-amino-4-chloroanthraquinone-2-sulphonic acid,
1-amino-4-bromoanthraquinone-2,6-disulphonic acid,
1-chloro- or bromoanthraquinone,
1,5-dichloro- or -dibromoanthraquinone,
1,8-dichloro- or -dibromoanthraquinone,
1,4,5-trichloroanthraquinone,
1-amino-2-methyl-4-chloroanthraquinone,
1-amino-4-mercaptoanthraquinone,
1-amino-8-chloroanthraquinone,
1-amino-2-cyano-4-chloro- or -bromoanthraquinone.

Suitable five-membered heterocyclic compounds are for example:

2-mercapto-6-aminobenzoxazole,
2-mercaptobenzoxazole-5-sulphonic acid,
2-mercapto-1-butylbenzimidazole-5-sulphonic acid,
2-mercaptobenzoxazole-5-sulphonic acid amide,
2-mercaptobenzoxazole-5-sulphonic acid N-isopropoxypropylamide,
2-mercapto-6-aminobenzoxazole-5-sulphonic acid,
2-mercapto-7-aminobenzoxazole-5-sulphonic acid,
2-mercapto-5-aminobenzoxazole-7-sulphonic acid,
2-mercapto-1-isopropoxypropylbenzimidazole-5-sulphonic acid N-isopropylamide,
2-mercapto-1-methoxypropylbenzimidazole-5-sulphonic acid N-isopropoxypropylamide,
2-mercapto-1-butylbenzimidazole-5-sulphonic acid N-isopropoxypropylamide,
2-mercaptobenzthiazole-5-sulphonic acid,
2-chlorobenzoxazole-5-sulphonic acid,
2-mercapto-6-(α,β-dibromopropionyl)-aminobenzoxazole,
2-mercapto-6-(α,β-dibromopropionyl)-aminobenzoxazole-5-sulphonic acid,
2-mercapto-7-(α,β-dibromopropionyl)-aminobenzoxazole-5-sulphonic acid,
2-mercapto-5-(α,β-dibromopropionyl)-aminobenzoxazole-7-sulphonic acid, as well as further condensation products of suitable aminomercaptobenzimidazoles, aminomercaptobenzoxazoles or aminomercaptobenzthiazoles and with acylating agent which contain a reactive radical.

The following may for example be mentioned as acylating agents which contain a fibre-reactive radical: chloroacetyl chloride or bromoacetyl chloride, β-chloropropionyl chloride or β-bromopropionyl chloride, α,β-dichloropropionyl chloride or α,β-dibromopropionyl chloride, chloromaleic anhydride, carbyl sulphate, acrylyl chloride, β-chloroacrylyl chloride or β-bromoacrylyl chloride, α-chloroacrylyl chloride or α-bromoacrylyl chloride, α,β-dichloroacrylyl chloride or dibromoacrylyl chloride, trichoroacrylyl chloride, chlorocrotonyl chloride, propiolic acid chloride, 3,5 - dinitro - 4 - chlorobenzene sulphonic acid or carboxylic acid chloride, 3 - nitro - 4 - chlorobenzenesulphonic acid or carboxylic acid chloride, 2,2,3,3-tetrafluorocyclobutane-1-carboxylic acid chloride, β-chloroethylsulphonyl - endomethylene - cyclohexanecarboxylic acid chloride, acrylsulphonyl-endomethylene-cyclohexane-carboxylic acid chloride, and particularly heterocyclic acid halides and their derivatives, for example the 2-chlorobenzoxazole carboxylic acid chlorides, 2-chlorobenzthiazole carboxylic acid or sulphonic acid chlorides, and especially the following compounds which contain at least two nitrogen atoms as hetero-atoms of a 6-membered heterocyclic compound: 4,5 - dichloro-1-phenylpyridazone carboxylic acid or sulphonic acid chloride, 4,5 - dichloropyridazone propionic acid chloride, 1,4-dichlorophthalzine carboxylic acid or sulphonic acid chloride, 2,3 - dichloroquinoxaline carboxylic acid or sulphonic acid chloride, 2,4-dichloroquinazoline carboxylic acid or sulphonic acid chloride, 2 - methanesulphonyl - 4 - chloro - 6 - methylpyrimidine, tetrachloropyridazine, 2,4 - bis-methanesulphonyl - 6 - methylpyrimidine, 2,4,6 - tri- or 2,4,5,6-tetrachloropyrimidine, 2,4,6 - tri- or 2,4,5,6 - tetrabromopyrimidine, 2-methanesulphonyl - 4,5 - dichloro - 6 - methylpyrimidine, 2,4-dichloropyrimidine - 5 - sulphonic acid, 5-nitro- or 5-cyano - 2,4,6 - trichloropyrimidine, 2,6 - bis-methanesulphonylpyridine - 4 - carboxylic acid chloride, 2,4 - dichloro - 5 - chloromethyl - 6 - methylpyrimidine, 2,4-dibromo - 5 - bromomethyl - 6 - methylpyrimidine, 2,4-dichloro - 5 - chloromethylpyrimidine, 2,4 - dibromo - 5 - bromomethylpyrimidine, 2,5,6 - tri-chloro-4-methylpyrimidine, 2,6 - dichloro - 4 - trichloromethylpyrimidine or especially 2,4 - dimethanesulphonyl - 5 - chloro - 6-methylpyrimidine, 2,4,6 - trimethanesulphonyl - 1,3,5-triazine, 2,4 - dichloropyrimidine, 3,6 - dichloropyridazine, 3,6 - dichloropyridazine - 5 - carboxylic acid chloride, 2,6 - dichloro- or 2,6 - dibromo - 4 - carboethoxypyrimidine, 2,4,5 - trichloropyrimidine, 2,4 - dichloropyrimidine-6 - carboxylic acid chloride, 2,4 - dichloropyrimidine-5-carboxylic acid chloride, 2,6 - dichloro- or 2,6-dibromopyrimidine-4- or -5-carboxylic acid or sulphonic acid amides or -4- or -5-sulphonic acid chlorides, 2,4,5,6-tetrachloropyridazine, 5 - bromo - 2,4,6 - trichloropyrimidine, 5 - acetyl - 2,4,6 - trichloropyrimidine, 5-nitro - 6 - methyl - 2,4 - dichloropyrimidine, 2 - chlorobenzthiazole - 6 - carboxylic acid chloride, 2 - chlorobenzthiazole - 6 - sulphonic acid chloride, 5 - nitro-6-methyl - 2,4 - dichloropyrimidine, 2,4,6 - trifluoro-5-chloropyrimidine, 2,4,5,6 - tetrafluoropyrimidine, 2,4,5-trifluoropyrimidine, 2,4,6 - trichloro(-tribromo- or trifluoro-)-1,3,5-triazine, and 4,6 - dichloro(dibromo- or -difluoro-)- 1,3,5 - triazines which are substituted in the 2-position by an aryl or alkyl radical, for example a phenyl, methyl or ethyl radical, or by the radical of an aliphatic or aromatic mercapto compound bound via the sulphur atom or hydroxyl compound bound via the oxygen atom, or especially by an amino group or by the radical of an aliphatic, heterocyclic or aromatic amino compound bound via the nitrogen atom. As such compounds, the radicals of which can be bound to the triazine nucleus in the 2-position by reaction with trihalogenotriazines, the following may for example be mentioned: aliphatic or aromatic mercapto compounds or hydroxy compounds, for example thioalcohols, thioglycollic acid, thiophenols, alkoxyalkanols, methyl, ethyl or isopropyl alcohol, glycollic acid, phenol, chlorophenols or nitrophenols, phenol carboxylic acids and phenol sulphonic acids, naphthols, naphthol sulphonic acids and the like, but especially ammonia and compounds containing amino groups which can be acylated, for example hydroxylamine, hydrazine, phenylhydrazine, phenylhydrazine sulphonic acids, glycol monoalkyl ethers, methylamine, isopropylamine, methoxyethylamine, methoxypropylamine, dimethylamine, diethylamine, methylphenylamine, ethylenephenylamine, chloroethylamine, ethanolamines, propanolamines, benzylamine, cyclohexylamines, morpholine, piperidine, piperazine, aminocarbonic acid esters, aminoacetic acid ethyl ester, aminoethane sulphonic acid and N-methylaminoethane sulphonic acid, but particularly aromatic amines, for example aniline, N-methylaniline, toluidines, xylidines, chloroanilines, p- or m-aminoacetanilide, aminophenols, anisidine, phenetidine and especially anilines containing an acid group, for example sulphanilic, metanilic and orthanilic acids, aniline disulphonic acids, aminobenzyl sulphonic acids, aniline-ω-methane sulphonic acid, aminobenzene dicarboxylic acids, naphthylamine - 1 - monodi- and tri-sulphonic acids, aminobenzoic acids, for example 2-hydroxy-5-aminobenzoic acid, and also coloured compounds or compounds possessing dyestuff characteristics, for example 4-nitro-4'-amino-stilbene disulphonic acid, 2 - nitro - 4'-aminodiphenylamino - 4,3' - stilbene disulphonic acid, 2 - nitro-4'-aminodiphenylamine - 4,3' - disulphonic acid and especially aminoazo dyestuffs or aminoanthraquinones or phthalocyanines which still contain at least one reactive amino group.

The introduction of the substituent in the 2-position of the triazine radical can also take place after the condensation with the starting diamine, or after the reaction according to the invention, to give the anthraquinone compound of the Formula 1.

Apart from those which can be introduced by acylation, further fibre-reactive radicals which may be mentioned are for example the vinylsulphone, β-sulphatoethylsulphone or β-thiosulphatoethylsulphone, β-thiosulphatopropionylamide, β-thiosulphatoethylsulphonylamide or sulphonic acid-N,β-sulphatoethylamide group, which can be introduced in a different manner, for example by ester formation or thioester formation.

As compounds of the Formula 3, which contain a fibre-reactive radical which cannot be introduced by acylation and in which the fibre-reactive radical is thus preferably not bounded through an amino group, but directly bound to the benzene radical, the sulpho-esters of the following sulphones may especially be mentioned: 1 - amino - 2- methoxy - 5 - (β-hydroxyethyl)-phenylsulphone, 1-aminobenzene-3- or -4-β-hydroxyethylsulphone, 1 - amino - 2- methylbenzene - 5 - β-hydroxyethylsulphone, 1-amino-4- (β - hydroxyethylsulphonylpropionylaminomethyl)-benzene, 1 - amino - 4 - (β-hydroxyethylsulphonylamino)-benzene and also reactive compounds obtainable by means of appropriate methylols according to Einhorn, for example 1 - amino - 4 - chloroacetylaminomethylbenzene or 1 - amino - 3 - chloroacetylamino-methylbenzene - 6- sulphonic acid.

The condensation with the acid halides or anhydrides or with the heterocyclic halogen compounds is advantageously carried out in the presence of acid-binding agents, for example sodium carbonate. In all these reactions it is obvious that the procedure to be followed is such that an unsaturated bond or a replaceable halogen atom still remains in the finished product.

According to a modification of the process according to the invention, compounds of the Formula 1 can also be obtained by starting from compounds of the Formula 1 which contain a sulphonic acid group as the substituent $V_2$, and splitting off the sulphonic acid group by reduction.

According to this variant, the reductive splitting off of the sulphonic acid group present in the 2-position takes place, for example in a weakly acid to alkaline, preferably aqueous, medium by means of weak reducing agents, for example sodium sulphide, glucose, cellulose xanthate, hydroxyalkane sulphonic acids, zinc or sodium formaldehyde-sulphoxylate or by means of stronger reducing agents for example sodium dithionite, thiourea dioxide and the like. The reduction is advantageously carried out at moderately elevated temperature, for example at 20 to 60° C. After splitting off the sulphonic acid group in the 2-position, the resulting compounds can be reoxidised if desired. Thus the compounds according to the invention are obtained even when the treatment with reducing agents has not only effected the splitting off of the sulphonic acid group in the 2-position of the anthraquinone nucleus, but also a reduction in the anthraquinone nucleus.

Further, the α-bromoacrylyl derivatives of the compounds of Formula 1 can be manufactured from the corresponding α,β-dibromopropionyl compounds by splitting off hydrogen bromide. The splitting off of the hydrogen bromide takes place according to known methods, for example by treatment with alkali, preferably at a low temperature.

The benzimidazoles, benzoxazoles and benzthiazoles of the formula

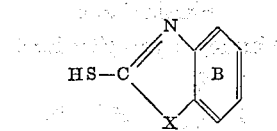

or

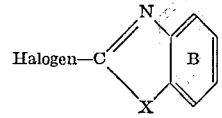

wherein X and B have the meaning indicated for Formula 2, which are used as starting compounds, are new and represent valuable intermediate compounds for the manufacture of the compounds of Formula 1 according to the invention.

The compounds of Formula 1 according to the invention are new. They are suitable for use as dyestuffs. Those which contain a sulphamide group in the heterocyclic radical are especially suitable for dyeing cellulose ester spinning compositions, where athe excellent build-up capacity of the dyestuffs should be particularly mentioned.

Suitable cellulose esters are particularly the cellulose esters of organic acids, especially aliphatic carboxylic acids having a low molecular alkyl group, especially the cellulose acetates of various degrees of esterification.

The compounds of Formula 1 which contain a reactive radical are suitable for dyeing and printing the most diverse materials, for example materials of animal origin, for example leather, silk and particularly wool, as well as various synthetic fibres, for example those made of polyamides and polyurethanes. They are especially suitable for dyeing from a neutral to acid medium. The dyeings thus obtained on wool have excellent fastness to light, fulling, perspiration and washing.

The new dyestuffs are also suitable for dyeing and printing cellulose-containing materials, for example cotton and regenerated cellulose fibres, in which case they are subjected to a heat treatment in the presence of alkali, for example in the presence of sodium carbonate or bicarbonate, sodium hydroxide or trisodium phosphate for fixing purposes. They are especially suitable for dyeing by the so-called cold dwell process. Compared with the nearest previously known dyestuffs, the dyestuffs obtained according to the invention are distinguished by generally better properties of wet fastness and especially by better behaviour in the presence of levelling agents, especially in the presence of polyglycol ether derivatives which contain on average at least 10 —$CH_2$—$CH_2$—O— groups and are derived from primary monoamines which contatin an aliphatic hydrocarbon radical having at least 20 carbon atoms.

In the examples which follow the parts denote parts by weight and the percentages denote percentages by weight unless otherwise stated.

EXAMPLE 1

15 parts of 1-amino-4-bromoanthraquinone are suspended in 300 parts of n-butanol and 27 parts of 1-butyl-2-mercaptobenzimidazole - 5 - isopropoxypropylsulphamide (manufactured by reaction of 1-butylamino-2-aminobenzene-4-isopropoxypropylsulphamide with carbon disulphide), 7 parts of potassium carbonate, 2 parts of copper acetate and 0.5 part of copper powder are added, and the whole is boiled for three hours under reflux. The mixture is allowed to cool to 40° C., diluted with an equal volume of methanol and filtered. The dyestuff is washed with methanol and water. The dried product dissolves in acetone to give a red colour and dyes acetate rayon in bulk in brilliant bluish-red shades which are fast to light and washing.

The following dyestuffs which dye acetate rayon in the shades indicated can be manufactured according to the same process.

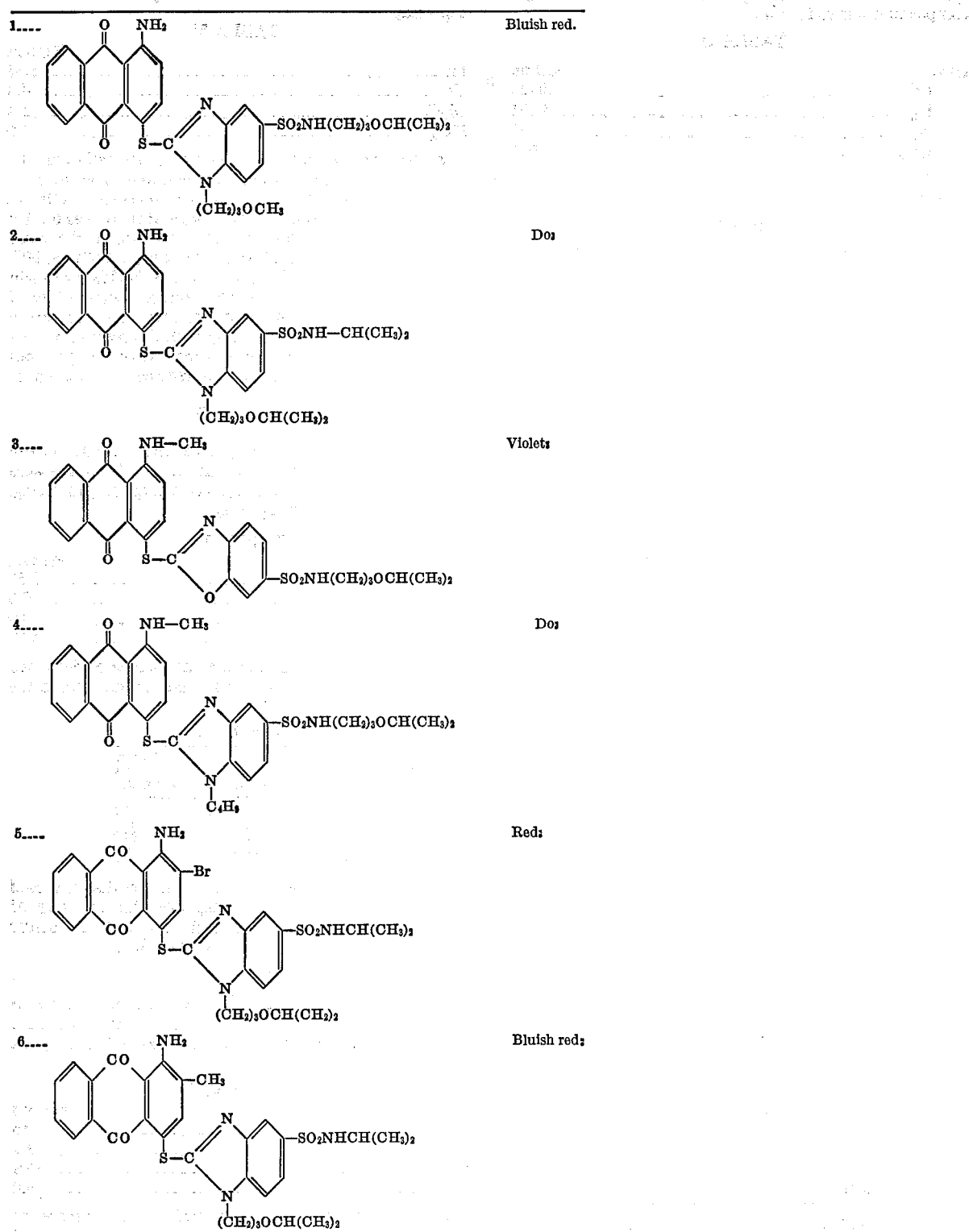

EXAMPLE 2

15 parts of 1-amino-4-bromoanthraquinone are suspended in 300 parts of butanol, and 2.5 parts of 2-mercaptobenzoxazole-5-isopropoxypropylsulphamide, 7 parts of potassium carbonate, 2 parts of copper acetate and 0.5 part of copper powder are added, and the whole is boiled for three hours under reflux. The mixture is worked up as in Example 1. The dyestuff obtained dyes Dacron in bluish red shades which are fast to light and wet processing.

EXAMPLE 3

40.4 parts of sodium 4-bromo-1-aminoanthraquinone-2-sulphonate are stirred at 80 to 85° C., with 400 parts of hot water, 20 parts of 6-amino-2-mercaptobenzoxazole, 16 parts of sodium bicarbonate, 1 part of copper (I) chloride and 1 part of copper powder until condensation is complete. The dyestuff resulting therefrom is isolated by filtration. The dyestuff paste is dissolved in a mixture of 200 parts of water and 200 parts of dioxane at room temperature. After adding 25 parts of sodium bicarbonate, 37.6 parts of 1,2-dibromopropionyl chloride are added dropwise, and after completion of the reaction the acylated dystuff is separated by precipitation with sodium chloride, filtered and dried. It is a dark red powder which dissolves in water to give a red colour and in concentrated $H_2SO_4$ to give a pale yellow colour. It dyes wool from a weakly acid bath in the presence of levelling agents brilliant bluish red shades having good fastness properties.

When one of the following compounds is used as the fibre-reactive acylating agents instead of 1,2-dibromopropionyl chloride similar dyestuffs are obtained which give dyeings of good fastness properties on wool or cotton: acrylyl chloride, α-bromoacrylyl chloride, β-chloropropionyl chloride, 2,2,3,3 - tetrafluorocyclobutane-1-carboxylic acid chloride, β-2′,2′,3′,3′-tetrafluorocyclobutane-acrylic acid chloride, 2-chlorobenzthiazole-6-carboxylic acid or sulphonic acid chloride, 1,4-dichlorophthalazine-6-carboxylic acid chloride, 2,3-dichloroquinoxaline-6-carboxylic acid chloride, 4,5 - dichloropyridaz-6-one-1-propionic acid chloride, 2-methylsulphonyl-4-chloro-6-methylpyrimidine, tetrachloropyrimidine, 2,4,6 - trifluoro - 5-chloro-pyrimidine or cyanuryl chloride.

The following dyestuffs which dye wool in the shades indicated are obtained in the same manner as described above.

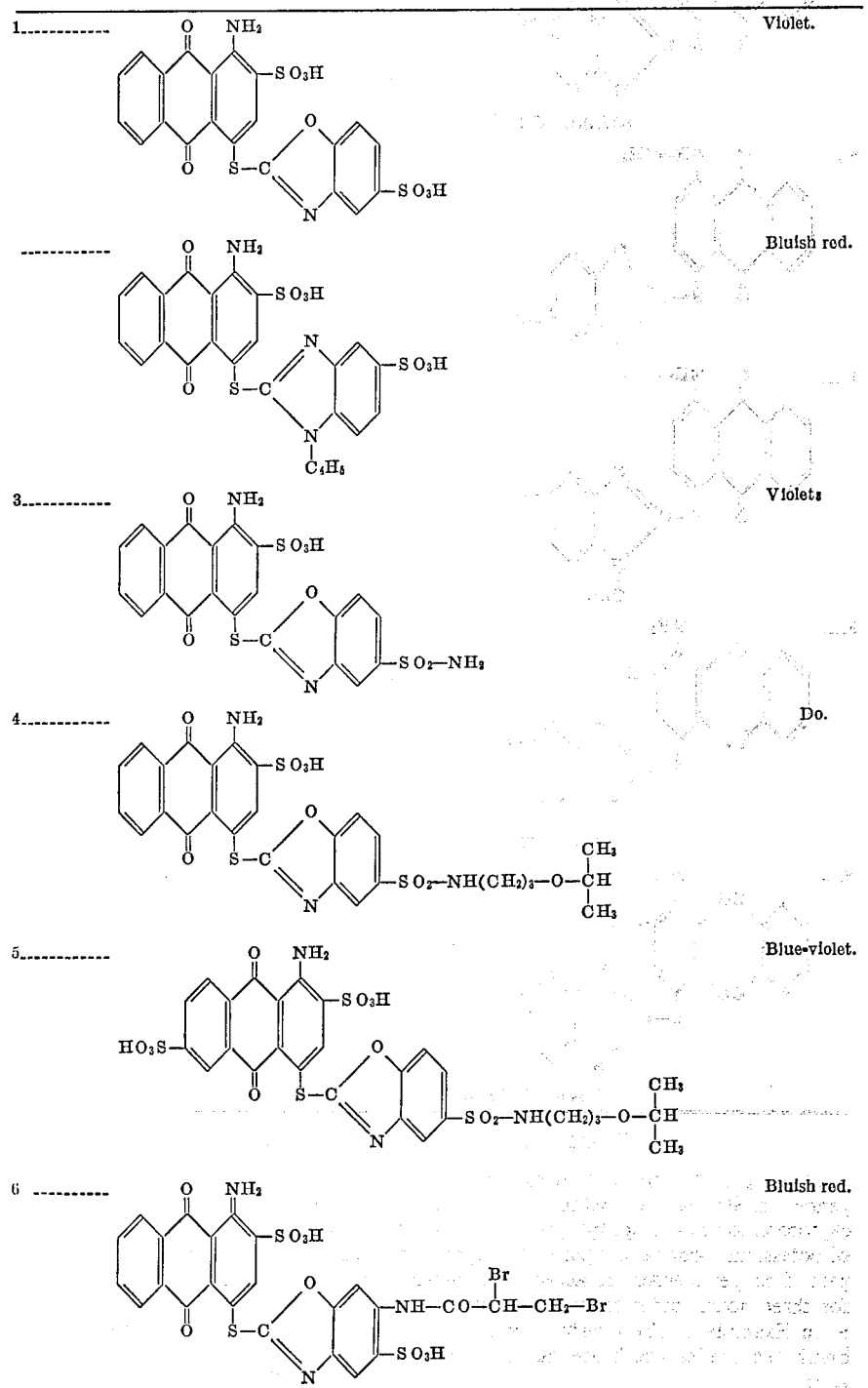

TABLE—Continued

| 7 | [anthraquinone structure with NH₂, SO₃H, S-C oxazole, NH-CO-CH(Br)-CH₂-Br, SO₃H] | Violet. |
| 8 | [anthraquinone structure with NH₂, SO₃H, S-C oxazole with SO₃H, NH-CO-CH(Br)-CH₂-Br] | Bluish red. |
| 9 | [anthraquinone structure with NH₂, SO₃H, S-C oxazole, NH-CO-CH(Br)-CH₂-Br] | Do. |
| 10 | [anthraquinone structure with HO₃S, NH₂, SO₃H, S-C oxazole with SO₃H, NH-CO-CH(Br)-CH₂-Br] | Do. |
| 11 | [anthraquinone structure with HO₃S, NH₂, SO₃H, S-C oxazole with SO₃H, NH-CO-CH(Br)-CH₂-Br] | Violet. |

Dyeing instruction 2 parts of the dyestuff obtainable according to Example 3 are dissolved in 4000 parts of water, 10 parts of crystalline sodium sulphate are added and 100 parts of well-wetted wool are introduced at 40 to 50° C. into the dyebath thus obtained. Thereafter 2 parts of 40% acetic acid are added, the bath is raised to the boil during ½ hour, and dyeing is carried out at the boil for ¾ hour. Finally, the wool is rinsed with cold water and dried. The wool is dyed in red shades fast to washing and of good fastness to light.

What we claim is:

1. An anthraquinone of the formula

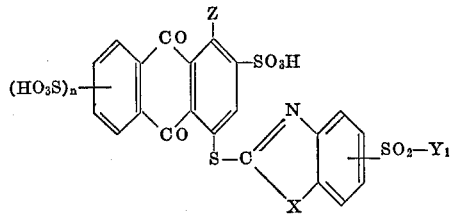

in which $n$ is 0 or 1,

Z is $NH_2$ or NHR wherein R is selected from the group consisting of lower alkyl, phenyl, 2',6'-dibromo-4'-methylphenyl, 4'-methoxyphenyl, 2',4',6' - trimethylphenyl and 4'-methylphenyl, X is NH or N-lower alkyl which is unsubstituted or substituted by lower alkoxy, $Y_1$ is NH-lower alkyl which is unsubstituted or substituted by lower alkoxy.

2. The compound of the formula

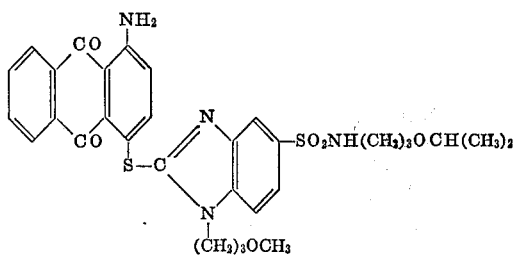

3. The compound of the formula
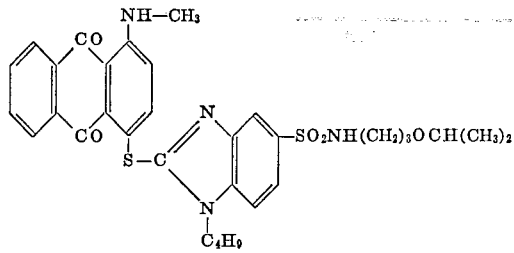
References Cited
UNITED STATES PATENTS
3,318,903  5/1967  Peter et al. _____ 260—309.2
FOREIGN PATENTS
1,424,062  11/1965  France _____ 260—309.2
1,029,964  10/1958  Germany _____ 260—309.2
6411507    4/1965   Netherlands _____ 260—309.2
426,066    6/1967   Switzerland _____ 260—309.2
468,440             Switzerland _____ 260—309.2
NATALIE TROUSOF, Primary Examiner
U.S. Cl. X.R.
8—39, 40; 260—243 B, 247.1, 249, 256.4 N, 256.5 R, 293.57, 293.58, 293.6, 303, 306, 307.5, 309, 312